Figure 1:
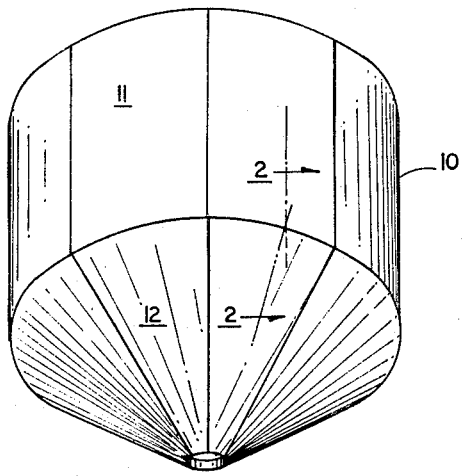

Sept. 28, 1965  J. H. DAWSON  3,208,621
INSULATED TANK FOR LIQUIDS BOILING BELOW AMBIENT TEMPERATURES
Filed Aug. 16, 1963  3 Sheets-Sheet 1

INVENTOR.
JOHN H. DAWSON
BY
ATTORNEY

Sept. 28, 1965 J. H. DAWSON 3,208,621
INSULATED TANK FOR LIQUIDS BOILING BELOW AMBIENT TEMPERATURES
Filed Aug. 16, 1963 3 Sheets-Sheet 2
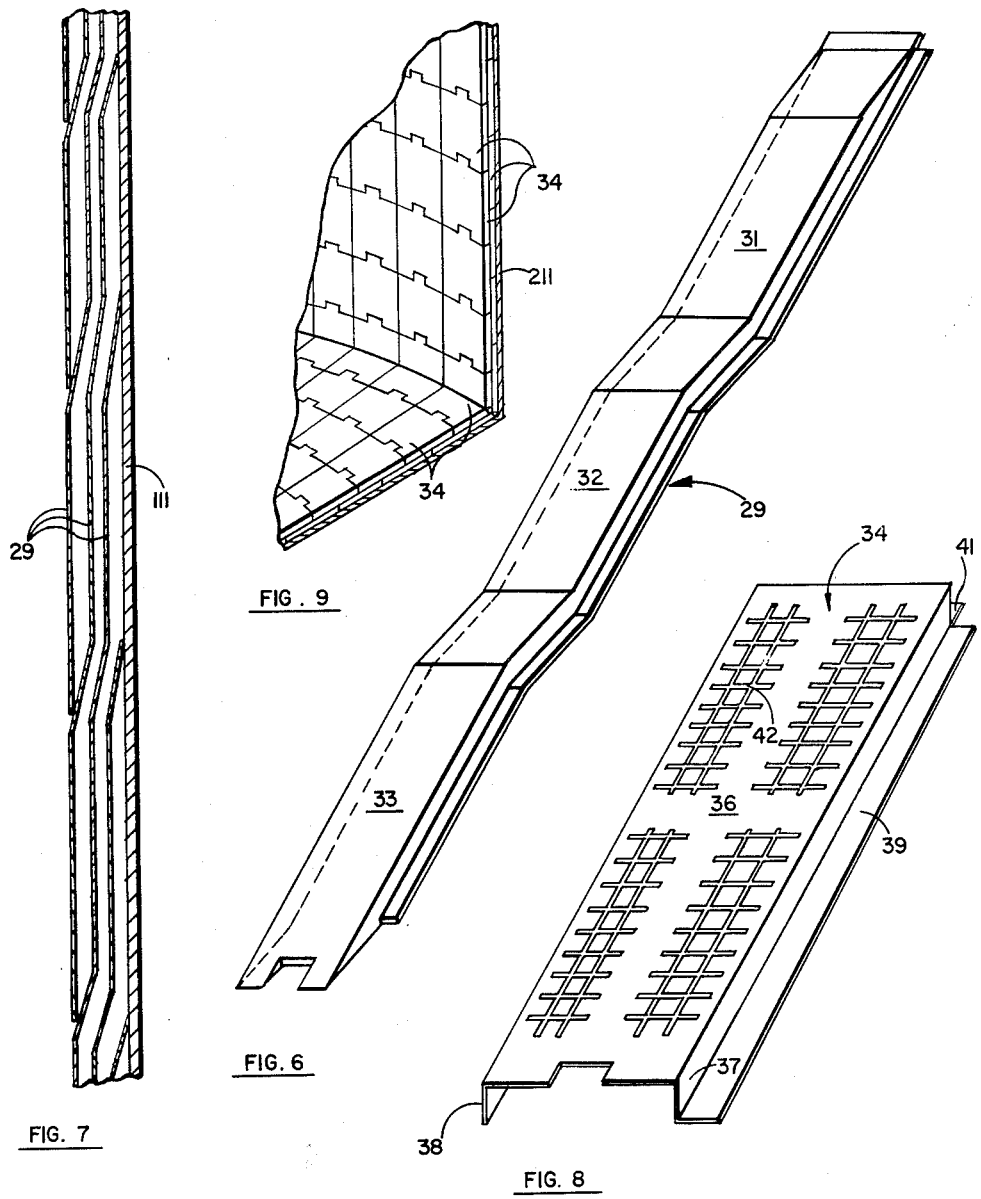
INVENTOR.
JOHN H. DAWSON
BY 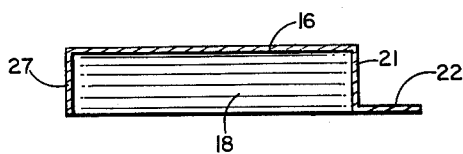
ATTORNEY Sept. 28, 1965 J. H. DAWSON 3,208,621
INSULATED TANK FOR LIQUIDS BOILING BELOW AMBIENT TEMPERATURES
Filed Aug. 16, 1963 3 Sheets-Sheet 3

INVENTOR.
JOHN H. DAWSON
BY
ATTORNEY

United States Patent Office 3,208,621
Patented Sept. 28, 1965

3,208,621
INSULATED TANK FOR LIQUIDS BOILING BELOW AMBIENT TEMPERATURES
John H. Dawson, Downey, Calif., assignor to North American Aviation, Inc.
Filed Aug. 16, 1963, Ser. No. 302,590
1 Claim. (Cl. 220—9)

This invention relates to storing and shipping cold boiling liquids. More particularly this invention relates to insulating containers for liquified gases, the boiling point of which is substantially below ambient temperature.

The trend of modern rocket development is toward the use of cryogenic fuels such as, for example, liquid oxygen or liquid hydrogen to afford savings in weight and increases in power. The boiling point of oxygen is about —297° F. at sea level pressure and the boiling point of hydrogen is approximately —457° F. In order to minimize the quantity of liquid that is lost by evaporation and boiling, insulation is provided on tanks that store such liquids. In storage tanks that remain on the ground it is possible to use high efficiency thermal insulations which have attendant high weight and frequently involve evacuated jackets and heavy pumping equipment. In an airborne vehicle it is necessary to compromise the quality of the insulation in order to obtain a structure having a low weight. When handling liquid hydrogen it is also necessary to maintain the surfaces exposed to air at a temperature above about —290° F. to eliminate the condensation of oxygen from the atmosphere which would create a great fire and explosion hazard.

Insulation on cryogenic containers for airborne use can be either external to the sealing wall of the container or may be internal and in contact with the cryogenic liquid. Insulations that have been employed often consist of layers of porous material with trapped gases therein to provide an insulating space surrounding the container or a permeable material which is evacuated to provide improved insulation. The gas filled type insulation materials are subject to liquifaction and pressure changes of the filling gases and the evacuated insulations are subject to leakage and are generally heavy systems which are unsuitable for airborne applications.

Previous internal insulations have permitted the circulation of gases and liquids throughout the insulation and have been suitable only for applications wherein the container remains in a substantially horizontal or predetermined position. During the handling and flight of an airborne container, its attitude may vary substantially from a horizontal or predetermined position and there may be a substantial amount of sloshing and buffeting of the contained liquids which restricts use of a substantially rigid insulation. Previously available internal insulations are inoperable when the container is tilted at even a relatively small angle. Additionally in tanks used for many cryogenic liquids it is important to have extreme cleanliness which cannot be obtained in the porous internal insulation materials.

Accordingly it is a broad object of this invention to provide a thermal insulation overcoming deficiencies of the prior structures.

There is provided in an illustrative embodiment of this invention a tank having a plurality of superposed sheet like shingles on the inside of the shell of the tank defining a plurality of superposed pockets substantially parallel to the shell and contiguous thereto. The pockets are closed at the tops and sides thereof to contain a small quantity of gas evolved from the cryogenic liquid and are open at the bottom to permit the evolved gas to enter. The pockets are so formed that they extend a relatively small distance inwardly of the shell of the container and along the shell a relatively large distance. A plurality of these pockets are disposed peripherally in a horizontal row around the inside of the container and a plurality of similar rows are distributed vertically and superposed in layers substantially parallel to the shell to form a plurality of pockets extending inwardly of said shell.

It is a broad object of this invention to provide a tank for containing liquified gas.

It is an object of this invention to provide lightweight insulation for liquified gas containers.

It is a further object of this invention to provide a novel container for cold boiling liquids which is light in weight and may be economically fabricated.

Figure 2:
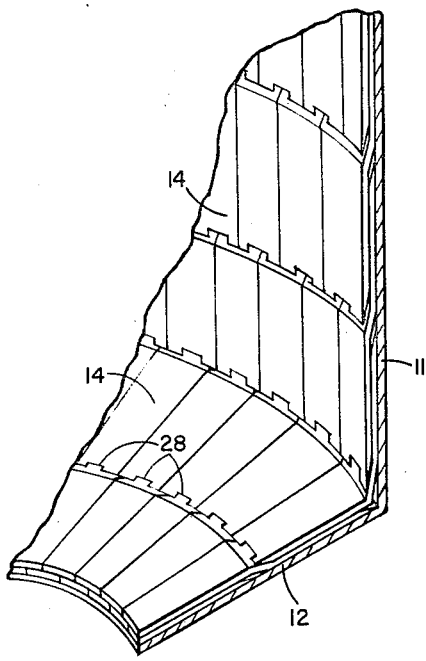
Figure 3:
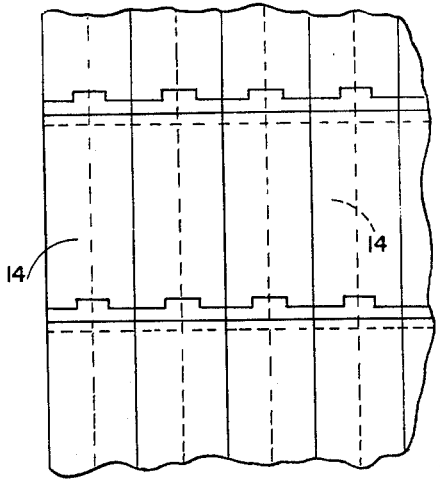
Figure 4:
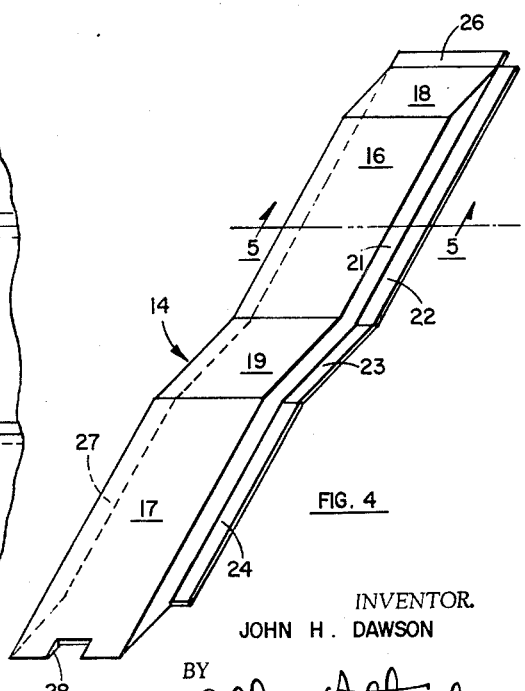
Figure 11:
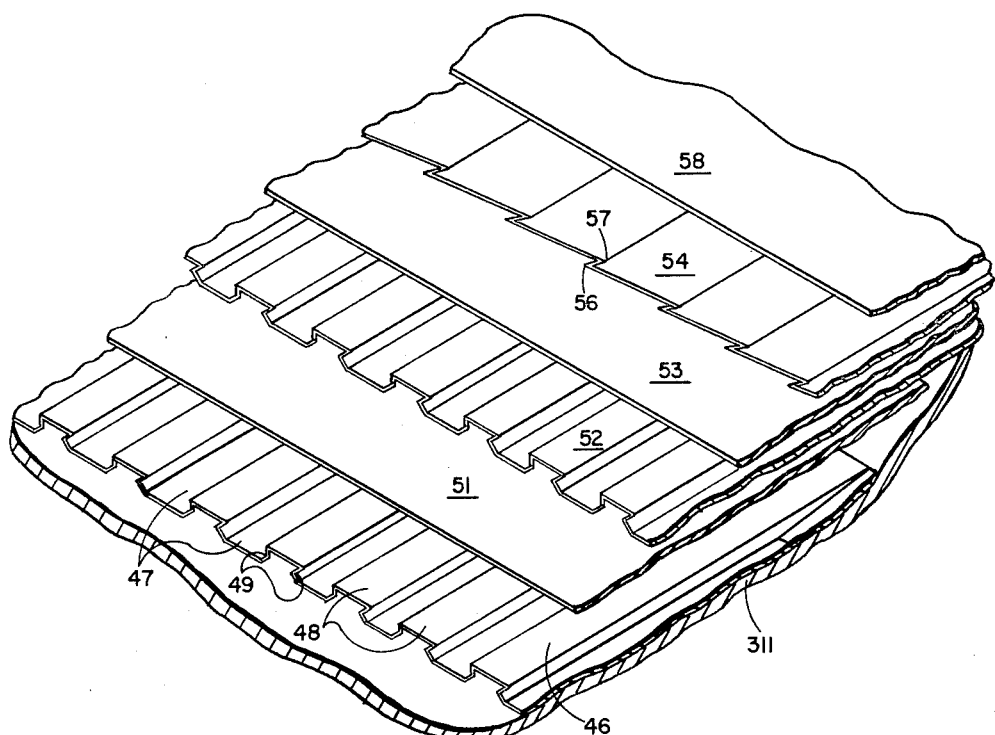
Figure 10:
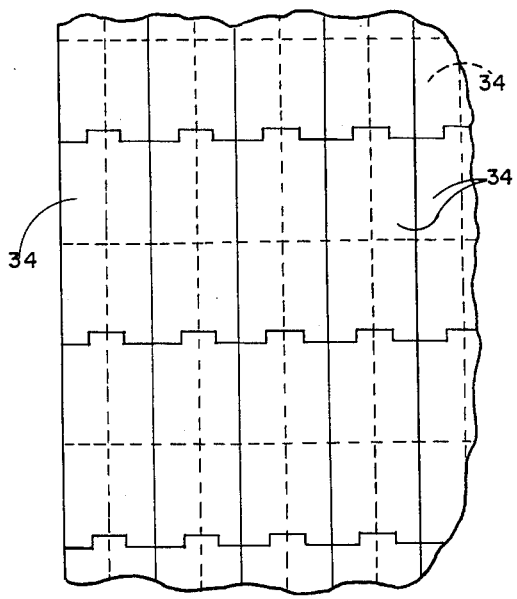

Other objects and the many advantages of this invention will be apparent from the following detailed description when read in conjunction with the accompanying drawings wherein:

FIG. 1 illustrates a typical container,
FIG. 2 is a fragmentary view of a portion of the container bottom and side constructed according to the principles of this invention,
FIG. 3 is a view of the inside tank wall,
FIG. 4 illustrates a typical shingle for use in such a tank,
FIG. 5 is a cross-section of the shingle of FIG. 4,
FIG. 6 is a second embodiment of shingle for use in a tank,
FIG. 7 is a cross-section of a tank wall and a plurality of shingles of the type illustrated in FIG. 6,
FIG. 8 is a third embodiment of a shingle for use in the practice of this invention,
FIG. 9 is a fragmentary view of a tank having shingles of the type shown in FIG. 8;
FIG. 10 is a view of the tank wall of FIG. 9, and
FIG. 11 is a fragmentary view of a fourth embodiment of insulating structure.

In these figures like reference numerals refer to like parts.

FIG. 1 illustrates a typical tank used for containing cryogenic liquids and having a wall 11 and a bottom 12 with a suitable drain port 13. A cross section taken at the lines 2—2 and illustrated in the fragmentary view of FIG. 2 shows a plurality of typical shingles 14 on the inside wall of the tank.

A preferred shingle for use in the practice of this invention is conveniently formed by the bending of sheet metal, foil, or similar sheet material to form a geometry as shown on FIG. 4. This shingle has two large substantially flat portions 16 and 17 which are adapted to be parallel to the wall or shell of a tank when the shingle is affixed thereto. These portions are mutually displaced or offset in a direction normal to the tank wall. A connecting portion 18 is provided to lie between the first large flat portion 16 and a wall of the tank and is angulated relative to the wall and flat portions. A second angulated connecting portion 19 substantially parallel with the angulated connecting portion 18 lies between the first and second large flat portions 16 and 17 and serves as an interconnection therebetween. The connecting flat portions 18 and 19 are angulated relative to the large flat portions 16 and 17 and preferably are at an angle of approximately 10° to 15° from the aforesaid flat portions. It will be readily appreciated that the large portions of the shingle are only substantially flat and may have wrinkles due to the thinness of the stock of which they are formed, or may have dimples, grooves, ridges or other geometric irregularities to add rigidity or to insure spacing between the shingle and underlying structure. In a cylindrical tank as illustrated herein the large substantially flat portions may have a curvature corresponding to the size of the tank, or be buckled slightly because of the tank curvature.

A first side portion 21 extends at substantially a right angle from the flat portions to a tab 22 which is used to affix the shingle to the tank wall. The tab 22 is substantially parallel to the first large flat portion 16 of the shingle. The side portion 21 also spaces a tab 23 from the connecting flat portion 19 and a tub 24 from the second large flat portion 17. An additional top tab 26 is provided at the top portion of the shingle connected to the connecting portion 18 for securing to the shell of the tank. Thus the shingle has a substantially U shaped cross section with the legs of the U corresponding to side portions 21 and 27 (FIG. 5) and the bight of the U corresponding to the large flat portion of the shingle parallel to the tank wall.

Upon installation of the shingle 14 into the tank 10 the tabs 22 and 26 are affixed to the tank wall to provide a mechanical attachment and also a substantial gas seal. In the first shingles attached to the tank it is preferred to cut off and remove the flat portion 17 and the connecting portion 19 and the corresponding tabs to provide a single smaller shingle for the bottom row in the tank. A second like shingle is then secured to the tank wall by corresponding tabs 22 and 26 in a position such that the second side portion 27 of the second shingle abuts the first side portion 21 of the first shingle. It is convenient to provide a mechanical joint and gas seal between the side portions 21 and 27 of adjoining shingles. Similarly additional shingles are secured to the tank wall arrayed peripherally horizontally to form a row around the internal circumference of the tank.

A second row of shingles is then placed over the first row in such a manner that the shingles of the second row are staggered horizontally from the first row so that the side portions of the second row are displaced circumferentially from the side portions of the first row of shingles. In the second and subsequent rows of shingles secured to the tank wall a complete shingle as illustrated in FIG. 4 is employed. As in the first row of shingles, tabs 22 and 26 secure the shingle to the tank wall and provide a gas seal therebetween. The tabs 23 secure the second row of shingles to the flat connecting portions 18 of the first row of shingles and the tabs 24 are in securing and gas sealing relation to the first large flat portions 16 of the first row of shingles. In this manner the second row of shingles has the second large flat portion 17 superposed over the first large flat portion 16 of the underlying row of shingles and the connecting flat portion 19 of the second row is superposed over the connecting flat portion 18 of the underlying shingles. A part of the second large flat portion 17 also extends over the connecting flat portion 19 of the underlying shingle so that along any path extending perpendicular to the wall of the tank at least two thicknesses of shingle material and hence two trapped pockets of gas are encountered between the wall and the interior of the tank. A notch 28 is formed in the second large flat portion 17 of the shingles so that the bottom thereof is open to the liquid contained in the tank.

As has been stated the tabs 22, 23, 24, and 26 are in securing and gas sealing relation to the underlying structure, either the tank wall or an underlying shingle. Although welding in many cases is desirable, these tabs also can be affixed by mechanical fasteners, soldering, brazing or cementing. It should be noted that it is not-necessary that a perfect fluid seal be obtained between the shingles and the underlying structure but that a substanial gas seal is sufficient to prevent excessive gas flow and accompanying heat transfer, so long as the rate of leakage is less than the normal boil-off rate of the liquid in that small region represented by the opening at the bottom of the shingle.

Upon filling of the tank with a cryogenic liquid, a portion of this liquid will enter the pockets formed by the described shingles at the bottoms thereof. As the cryogenic liquid contacts the relatively warm portions of the container a large volume of gas is evolved, a portion of which gas becomes trapped in the pockets formed by the shingles and provides a barrier with insulating properties. Air present in the tank before filling is preferably displaced with the same composition gas evolved from the cryogenic liquid to prevent contamination of the liquid and to provide a known insulating value in the gas pockets.

In order to provide the greatest volume of useful space inside the tank, the gas pockets should be relatively thin. It is also desirable to keep the weight of the entire structure to a low level, therefore the material used in the fabrication of the shingles should be very thin. For the greatest economics of weight the material for the shingles need do little more than support its own weight, thus, for example, adequate shingles for use in a tank for containing liquid hydrogen are made of 0.005 inch thick aluminum foil. As explained hereafter the pockets formed are retained intact by a buoyancy effect, and to some extent, irregularities in the surfaces which space the surfaces apart.

In order to achieve economies in fabrication, it is desirable to have the individual shingles cover a relatively large area and, in addition, it is preferred that the shingles extend a relatively great vertical distance to counteract the stress effects due to sloshing of the liquid in the tank. When liquid sloshes against the side of tank there is a tendency to collapse the relatively thin shingle materials and deflate the pockets thereby destroying the insulating characteristics. However, by making the pockets relatively long in a vertical direction, an appreciable pressure gradient is obtained therein which has a buoyancy effect tending to force the pockets back into a normal position spaced apart from the tank walls. This buoyancy effect arises from the fact that the pressure on the inside of the pockets is the pressure at the level of the liquid at the bottom of the gas pocket and the pressure at a corresponding level in the interior of the tank is the pressure due to the head of liquid above that corresponding point. Thus it will be seen that the pressure of the gas at all points within the shingle pocket is greater than the pressure of the liquid outside, which pressure differential will tend to buoy the shingle away from the tank wall. The buoyancy effect is particularly pronounced in the upper portion of the shingle which is also nearer the tank wall and subject to less stress during sloshing. Thus, under even a severe sloshing condition at least one layer of shingle material and hence one layer of insulating gas exists between the cryogenic liquid and the tank wall. Any collapsed pockets are self recovering in that the buoyancy effect quickly restores the second layer upon cessation or reduction of sloshing and keeps the full insulating effect. The strength of the foil has a relataively smaller effect in resisting the liquid forces, the relatively greater portion of the resistance being due to the buoyancy effect.

Although the usual mode of operation of the tank is an upright position, some tilt may occur in handling or various flight phases, hence in order to avoid contact between the cryogenic liquid and the tank wall during a condition when the container is at an angle with the horizontal, it is desirable to have a plurality of pockets horizontally arrayed around the inside of the container. The discrete pockets formed by the shingles trap gas in separated areas that retain the gas even upon high degrees of tilt of the container. Because of the thinness of the pockets in a direction normal to the tank wall and their long dimension vertically in the tank, even at severe angles of tilt the cryogenic liquid is prevented from coming in contact with the warmer wall when the shingles are on the downward portion of the tilted tank. On the sides of a tilted tank the side portions of the shingles prevent the flow of gas peripherally in the tank and successfully prevent the cryogenic liquid from contacting the warmer wall and by making the pockets narrow, large angles of tip can be accommodated.

An additional benefit is gained by having a thin space behind the shingle with a long vertical distance in the tanks so that radiation from the warmer tank wall to the cryogenic liquid is interrupted by an opaque shingle and heat transfer is thereby minimized. Additionally by using a thin shingle material and a long vertical distance in the tanks, a long narrow path for thermal conductance exists and it is possible to construct the shingles out of relatively high thermal conductance materials such as, for example, aluminum. The shorter path through the sides of the shingles between the liquid and the tank wall is of less concern since the path is interrupted by a mechanical attachment, and the path is lengthened by staggering the adjacent rows of shingles horizontally so that no pair of edges overlie one another.

The insulation provided in the practice of this invention also has advantages in a zero gravity environment where liquid and gas may intermix and very slight forces may bring the liquid and the tank wall in contact. If the liquid contacts the warmer tank wall over a large area, as may occur in prior art structures, large volumes of gas are formed which impart appreciable forces to the liquid and the tank and may cause serious dynamic oscillations. In the insulation described herein, only a small contact between liquid and tank wall can occur before gas is evolved in the pockets to expel liquid. The forces on the liquid and the tank wall are thereby minimized and the insulating layer retained intact to minimize vaporization of the liquid.

The use of thin pockets between the insulation structure and the tank wall allows internal sealing of any leaks from outside the tank. When a leak develops in a wall of a tank, insulated according to the principles of this invention, a small hole is made at the point of leakage and a foaming plastic material is injected into the hole. This foaming material expands to fill the space within a pocket adjoining the wall, hardens in place and effectively seals the leaking region. To retain the foaming material in the pockets the tank can be inverted before injection, or by using a relatively viscous material in the thin pockets of this invention the material will cling to the sides of the pocket and solidify in place. Some foaming resins useful for sealing are set forth in U.S. Patent 2,897,641. Other resins that can be used with or without foaming include polyester resins, epoxy resins, phenolic resins and urea-formaldehyde resins. Emergency repairs of this sort can also be made in two steps or more wherein a small amount of foaming material is injected and solidified to substantially close off a pocket, and a larger amount is then injected to complete the leak sealing without foaming material escaping from the pocket. In any event, emergency repair of leaks can be made on the inside of the tank without having access to the inside. All repair work can be accomplished from outside the tank and leaks sealed without disturbing the insulation or destroying its effectiveness.

Cleaning of tanks for cryogenic liquids is quite important and the insulation described herein is readily cleaned. Cleaning of the inside of the gas pockets is readily provided with conventional degreasing units which supply condensable vapors which condense inside the pockets and clean out any organic materials that may be present. Liquid cleaning of the insulation is accomplished by inverting the tank and filling with the cleaning liquid. After cleaning, the fluids employed are readily replaced with purging gases which enter the pockets. Use of a light gas in an upright tank permits displacement of all heavy vapors from the pockets.

As shown in FIG. 2 there is provided a series of shingles on the bottom of the tank substantially the same as the shingles on the sides thereof. These shingles function in the same manner as the shingles on the sides of the tank, however, it will be apparent to one skilled in the art that in order to provide a continuum of shingles between the wall and the center port on a conical bottom, it is necessary that the individual shingles be formed in the shape of segments of a conical surface rather than in the form of relatively flat and parallel pieces. Similarly dual purpose and complex geometry shingles are provided at the intersection of the wall and the bottom of the tank to extend the insulation therebetween. By using an angle of 10° to 15° between the large substantially flat portion of the shingle parallel to the tank bottom and the portion angulated thereto, a tank bottom is constructed to have a cone that is within about 25° to 30° of being horizontal without having the cryogenic liquid come in contact with warm portions of the tank bottom. It is preferable in many applications to have a somewhat steeper cone so that appreciable degrees of tilt of the tank do not lead to contact of liquid with the tank bottom. It will be appreciated that shingle geometries can be readily provided having a smooth transition between a tank wall and bottom and having spherical or other complex curvatures for other tank geometries from that shown in the exemplary embodiment.

A second embodiment of shingle for use in a cryogenic container is shown in FIG. 6 wherein a typical shingle 29 is shown in perspective. FIG. 7 shows a cross section of a tank wall 111 having a plurality of shingles 29 on the inside surface thereof. The shingle 29 is similar in construction and application to the shingles 14 previously illustrated. It differs from the shingle of FIG. 4 by having first, second and third large flat portions 31, 32 and 33 which are adapted to lie substantially parallel to the wall of the tank in which the shingles are secured. In applying shingles of the type illustrated in FIG. 6 to the inside of a tank the second large flat portion 32 of one horizontally extending row of shingles is superposed over the first large flat portion 31 of the next lower row. Similarly the third large flat portion 33 of the next higher row of shingles is superposed over the second large flat portion 32 of the intermediate row of shingles. Thus, as is clearly seen in FIG. 7, at every point between the wall of the tank and the interior thereof at least three layers of shingle and three trapped gas pockets of considerable vertical extent are provided. It will be apparent to one skilled in the art that a larger number of flat portions can be provided on such shingles in order to provide a larger number of insulating pockets between the wall and the interior of the tank to further improve the insulating characteristics of the insulation. The increased number of pockets and vertical height of the pockets is an advantage in the condition where liquid buffeting can collapse the pockets since two or more pockets remain between the liquid and the wall for good insulation. This arises from the greater pressure differential at the upper ends of the long pockets than in the short pockets of the previously described embodiment.

A third embodiment of insulating shingle 34 functioning in a similar manner to the other described shingles is illustrated in FIG. 8. The shingle illustrated in perspective in FIG. 8 is one having a single large substantially flat portion 36. This large flat portion is adapted to lie parallel to a wall 211 of a tank to which it is secured and is spaced therefrom by first and second side portions 37 and 38. The shingle is readily secured to the wall of a tank by tabs 39 and 41 in a manner similar to the securing of the shingle 14 to a container wall. The large substantially flat portion of the shingle 36 is provided with a network of indentations 42 which form a pattern of corrugations serving to stiffen the large flat surface of the shingle and provide some additional mechanical strength and to help space the large flat surface of the shingle from the underlying structure when subjected to buffeting. Some of the area is left smooth for attachment of overlying shingles in a pattern that is staggered horizontally and vertically from the underlying shingles. Despite the stiffening and spacing due to the corrugations, the principal resistance to collapse of the shingle by liquid in the tank is provided by the buoyant force described above.

In the illustrative embodiment of FIG. 9, two thicknesses of shingles and hence two layers of gas pockets are provided between the tank wall 211 and the interior of the tank by fastening on typical shingles 34 to form a plurality of gas pockets. It will be apparent that a greater number of thicknesses can be applied as may be desired. In attaching the shingles to the wall of the tank they are arranged so that the side portions 37 and 38 in the next higher row in the tank are aligned with the corresponding side portions of the next lower row. When the overlying layer of shingles is applied the side portions are staggered horizontally from the side portions in the underlying shingles and the rows of shingles are displaced vertically one-half shingle length as illustrated in FIG. 10 to provide a maximum path length for thermal conductance through the shingle material. The pockets formed by the shingles are open at the bottom as has been previously described in relation to the first embodiment of the shingles and communication between the pocket formed by the underlying shingles and the cryogenic liquid is through the pockets formed by the overlying shingles.

Insulation incorporating the shingle of this embodiment performs in a manner similar to the manner described previously in relation to the first embodiment. This embodiment has the advantage over the first embodiment of being more economical to fabricate and install in a tank. However, because of the communication between underlying and overlying pockets the insulation is limited to relatively lower angles of tank tilting since liquid enters the gas pockets nearest the tank interior at high degrees of tilting. This effect can be alleviated by avoiding the horizontal staggering of the shingles so that there is communication between an underlying gas pocket and only a single overlying gas pocket rather than the communication with two overlying gas pockets as in the illustrative embodiment of FIG. 10.

A fourth embodiment of an insulation for a liquified gas container is shown in the fragmentary view of FIG. 11 wherein a plurality of horizontal circumferentially extending strips of sheet or foil are secured to the tank wall 311.

A first strip 46 is secured to the tank wall along the top edge of the strip. This strip has a series of horizontally arrayed pleats running vertically in the tank so as to form a substantially smooth portion at the top and a corrugated portion at the bottom thereof, with a gradual transition therebetween. The outer portions 47 of the pleats lying near the tank wall are secured thereto to provide a mechanical and substantially gas sealing joint extending vertically in the tank. An inner flat portion 48 is provided which, along with the side portions 49 between the inner and outer portions of the pleat define a pocket lying substantially parallel to the tank wall. This defined pocket is of greater thickness normal to the tank wall at the bottom thereof than at the top where the pocket tapers and diminishes to a complete closure. The circumferentially extending width of the pocket is substantially uniform throughout its vertical length.

Overlying the first pleated sheet 46 is a first flat sheet which is secured to the tank wall at the upper portion thereof. This sheet extends substantially the same distance vertically in the tank as the underlying sheet 46 but is displaced upwardly therefrom so as to overlap for approximately ¾ of its vertical extent. The overlying sheet 51 is secured in mechanical and gas sealing relation to the raised flat portions 48 of the pleated strip 46 to form a plurality of vertically extending joints. This forms a plurality of gas pockets in a second layer extending vertically substantially parallel to the tank wall. These pockets are defined by the overlying strip 51, the recessed portion 47 of the underlying pleated strip and side portions 49 of the pleated strip. These gas pockets also decrease from a maximum thickness at the bottom end of the joint where it attaches to the wall to a disappearing thickness at the top end where there is a horizontally extending joint to the wall of the tank.

A second pleated strip 52 is secured to the tank wall at the upper portion of the strip and in a manner similar to the pleated strip 46 is secured to the underlying flat sheet 51 to form a plurality of gas pockets therebetween. The pleated strip 52 extends approximately the same distance vertically in the tank as the underlying strips 46 and 51, and overlaps the flat strip for approximately ¾ of its length. Similarly a second flat sheet 53 overlies the pleated strip 52 in the same manner and for the same function as the strip 51 overlies the strip 46.

By repeating such a structure a plurality of gas pockets are formed extending horizontally and vertically between the tank wall and the tank interior to contain evolved gas from a cryogenic liquid and provide thermal insulation between the cryogenic liquid and the exterior of the tank. In the illustrative embodiment of FIG. 11 there are, at any point in the structure, two layers of gas pockets between the tank wall and the interior of the tank. As will be apparent by providing a greater overlap of the overlying and underlying shingles a greater number of gas pockets can be provided between the wall of the tank and its interior.

Overlying the flat strip 53 in FIG. 11 is a second type of pleated strip 54. Whereas the pleats in the strips 46 and 52 previously described are substantially symmetrical, the pleated strip 54 is asymmetrical and has approximately a saw-tooth shape as viewed from the bottom thereof. This pleated strip 54 is secured to the tank wall 31 at the top portion of the strip in a manner as has been previously mentioned. Likewise a typical outer edge 56 of the pleat is secured to the underlying sheet 53 to form a vertically extending mechanical and gas sealing joint. A typical inner portion 57 of the saw-tooth pleats is secured to an overlying sheet 58 to form a plurality of vertically extending mechanical and gas sealing joints. These pleats then define a plurality of pockets between the flat sheets and the pleated sheet, said gas pockets lying substantially parallel to the tank wall and diminishing in thickness from the bottom to the top. The fabrication of pleated sheet of this second type is easier than fabrication of the symmetrical pleats, however, the securing of the symmetrical pleats to the tank and other strips is more readily accomplished. An insulation structure using pleated strips can incorporate either or both types of pleats and, as will be apparent, the flat strips shown in the illustrative embodiment can be eliminated and the entire insulation formed of pleated sheets. Other variations will be apparent to one skilled in the art such as, for example, using strips of material that are gathered into a ruffle rather than uniformly pleated for forming the insulating structure.

It will also be apparent that with foil material as is conveniently employed in the practice of this invention, the surfaces and edges produced may be wrinkled and somewhat deformed in handling rather than having the geometric regularity illustrated in the accompanying drawings. No detriment in performance of the insulation is observed with wrinkled pleated sheets or shingles and after buffeting and rebuoying of the pockets in the insulation, virtually any fabricated structure will have deformation that alters the regularity.

The buoyancy effect in the gas pockets as has been described previously prevents collapse of the thin sheet or foil material employed to form the pleated structure of this embodiment. The pockets formed by the sheets are of uniform width in their vertical extent and decrease in thickness normal to the wall toward their upper end as formed in the tank. Under the buoying force of gas generated, these pockets tend to bulge inwardly of the tank and the thickness may not uniformly diminish throughout their vertical extent. Thus because of buckling of the thin sheet or foil the pockets may be larger in use than as fabricated and illustrated herein. Because of the buoying effect, the circumferentially extending width of the pockets is preferaby kept relatively small compared with the vertically extending length to minimize the extent of the bulging and maximize the carrying capacity of the tank. The proportions used are matters of design choice involving tank geometry, weight, manufacturing cost and heat transfer rates in trade-off analyses.

As described in relation to the individual shingles secured to a tank wall the pleated strips may be secured thereto by mechanical fasteners, welding, brazing, soldering or cementing. In this embodiment, as in the individual shingles, it is possible to use any of a variety of materials for fabrication such as, for example, various plastic materials and metals. However, for ease of fabrication it is preferred that thin sheets of aluminum be used to fabricate the individual shingles and the pleated and flat strips. Foil approximately 0.005 inch thick has proved satisfactory for the insulation and other gauges of aluminum foil can readily be substituted by one skilled in the art. The thermal conductivity of aluminum is no substantial detriment in the practice of this invention as the path for thermal conductance from the tank wall to the cryogenic liquid is thin and long, minimizing the quantity of heat transferred by this mechanism.

Although only certain exemplary embodiments have been set forth, it is apparent that various changes and modifications may be made by one skilled in the art without departing from the scope of this novel concept. It is to be understood that the above is by way of illustration only and is not to be taken by way of limitation, the operation and scope of this invention being limited only by the terms of the claim.

What is claimed is:

In a tank for storing liquid with a boiling temperature below ambient temperature at substantially atmospheric pressure,
   a plurality of vertically distributed horizontally extending rows of shingles each row comprising a plurality of vertically extending shingles collectively forming a row extending peripherally horizontally on an inside wall of the tank and secured to the wall to define a plurality of pockets in fluid communication with the tank interior at the bottom of the shingles,
   each said row overlapping the next lower row and having shingle edges staggered horizontally from shingle edges in the next lower row,
   each of said shingles comprising a first rectangular portion 16 parallel to the wall of the tank and displaced a small distance therefrom, a second rectangular portion 18 angulated relative to the first portion and extending between the top of the first portion and the wall of the tank, a third rectangular portion 17 parallel to the first portion and overlapping the first portion of corresponding shingles in the next lower row and displaced a small distance therefrom, a fourth rectangular portion 19 parallel to the second portion, connecting the first and third portions and superposed over and displaced a small distance from the second portion of corresponding shingles in the next lower row, and side portions extending from said rectangular portions normal to the tank wall for spacing the shingles from the tank and underlapping shingles and providing securing means thereto.

References Cited by the Examiner

UNITED STATES PATENTS

| | | | |
|---|---|---|---|
| 464,694 | 12/91 | Kinnear | 50—219 |
| 1,052,245 | 2/13 | Hockworth | 50—217 |
| 1,570,839 | 1/26 | Joaguin | 50—241 |
| 2,103,076 | 12/37 | Harshberger | 50—217 |
| 2,859,895 | 11/58 | Beckwith | 220—85 |
| 2,937,780 | 5/60 | Beckwith | 220—9 |
| 2,947,438 | 8/60 | Clauson | 220—15 |
| 2,958,442 | 11/60 | Lorentzen | 220—63 |
| 3,018,018 | 1/62 | Beckwith | 220—9 |
| 3,019,937 | 2/62 | Morrison | 220—9 |

FOREIGN PATENTS 181,971   4/36   Switzerland.

THERON E. CONDON, *Primary Examiner.*